March 25, 1924.
L. T. SINTZEL
ADVERTISING DEVICE
Filed Nov. 29, 1921
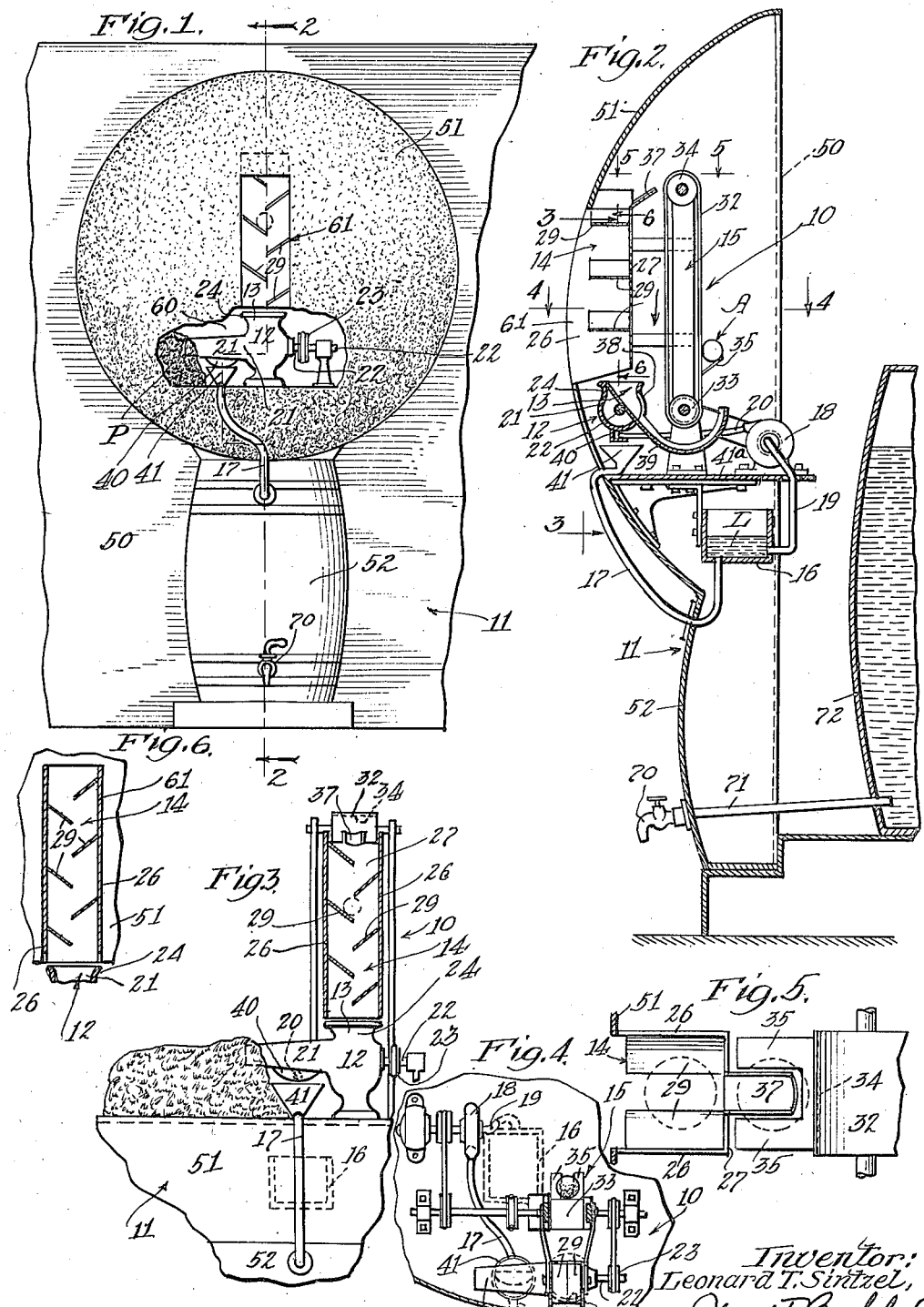

Patented Mar. 25, 1924.

1,487,816

UNITED STATES PATENT OFFICE.

LEONARD T. SINTZEL, OF VENICE, CALIFORNIA.

ADVERTISING DEVICE.

Application filed November 29, 1921. Serial No. 518,660.

*To all whom it may concern:*

Be it known that I, LEONARD T. SINTZEL, a citizen of the United States, residing in Venice, county of Los Angeles, State of California, have invented new and useful Improvements in Advertising Devices, of which the following is a specification.

This invention has to do with an advertising device adapted to be arranged in a store, booth, or the like, and it is an object of the invention to provide a device which will attract attention, cause comment, and will demonstrate the manner in which fruit juice, or the like, is obtained or prepared.

A particular feature of the invention is the provision of mechanism embodying a grinding or squeezing machine, a conveyer, a pump, etc., which when viewed from one direction appears to continuously feed and grind or press fruit to separate the juice and pulp thereof, but in fact conveys or handles one, or a few pieces of fruit and a suitable quantity of fruit juice over and over again and does not actually grind or press any of the fruit. Because of this feature the device can be operated at any time, or can be operated continuously, for purposes of demonstration or advertisement without actually using fruit and therefore at a very low cost.

Another noteworthy feature of the invention is the combination and arrangement of a display device, which for instance, includes an artificial fruit, or the like, and the mechanism above referred to, which forms a neat attractive structure and prevents persons in front of it from viewing the mechanism from any direction other than the one specified.

Another feature of the invention is the chute embodied in the mechanism for conducting the fruit from the conveyer to the grinding machine. The chute carries the fruit so that it can be seen from the front of the structure and so that it moves rather fast and yet takes a comparatively long time to pass through the chute.

The various objects and features of the invention will be best and more fully understood from the following detailed description of a typical preferred embodiment of the invention throughout which reference is had to the accompanying drawings in which—

Fig. 1 is a front elevation of the structure provided by the present invention; Fig. 2 is a vertical central sectional view of the structure, being a view taken as indicated by line 2—2 on Fig. 1; Fig. 3 is an enlarged front elevation of the mechanism provided by the present invention being a view, taken as indicated by line 3—3 on Fig. 2; Fig. 4 is a plan view of the mechanism provided by the invention, being a view taken as indicated by line 4—4 on Fig. 2; Fig. 5 is an enlarged plan view taken as indicated by line 5—5 on Fig. 2; and Fig. 6 is an enlarged vertical sectional view taken as indicated by line 6—6 on Fig. 2.

Throughout the drawings numeral 10 designates, generally, the portion of the structure which I herein term the mechanism, and numeral 11 designates, generally, the part of the structure which I herein term the display device. The mechanism 10 provided by the present invention comprises a grinder 12 having a receiving hopper 13, a chute 14 arranged above the grinder 12 to discharge into the hopper 13 of the grinder 12, a conveyer 15 which operates to receive fruit, or the like, from the hopper 13 and deliver it to the upper end of the chute 14, a fluid reservoir 16, a fluid conduit 17 leading from the grinder 12 to the reservoir 16, a pump 18, a fluid conduit 19 connecting the reservoir 16 and pump 18, and a fluid conduit 20 connecting between the pump 18 and grinder 12.

The grinder 12, which I illustrate in the drawings, is of a type commonly used for grinding fruit, and the like, for the purpose of separating the pulp and juice thereof and comprises, generally, a horizontally disposed body 21, an operating shaft 22 extending from one end of the body 21 and carrying a pulley 23, and a receiving hopper 13 arranged at one end of the body 21. In operation grinders of this general character receive fruit, or the like, at the hopper 13, operate on the fruit to separate the pulp and juice thereof, deliver the juice through an opening in the lower part of the body 21, and deliver the pulp from the end of the body opposite to that at which the hopper 13 is arranged. The present invention is not concerned with any particular type of grinder and, in fact, is not limited to the use of a grinder. In carrying out the invention a grinder, a press, or other mechanism for operating on fruit, or the like, may be advantageously used. For this reason when I use the term grinder I mean to include any similar or equivalent device such as a press, or the like, and do not mean specifically a grinder or a device such as I have illustrated in the drawings.

The chute 14 provided by the present invention is arranged above the hopper 13 of the grinder and is a vertically disposed structure having spaced side walls 26 and a back wall 27. The chute is open at top and bottom and is adapted to receive fruit or the like at its upper end and discharge it from its lower end. In accordance with the present invention the chute has no front wall but has a plurality of baffles 29 arranged at regular intervals throughout its length. The baffles 29 are preferably arranged so that they extend inwardly and downwardly alternately from opposite sides 26 as clearly illustrated throughout the drawings.

The conveyer 15 may comprise an endless belt 32 carried on suitable pulleys 33 and 34. The pulleys 33 and 34 are arranged so that the conveyer extends from a point rearward of and somewhat below the receiving hopper 13 of the grinder to a point opposite the upper end of the chute 14. Fingers 35 extend from the belt 32 and are adapted to hold a piece of fruit, or the like, in the manner illustrated at A in Fig. 2. When in operation the belt of the conveyer travels in the direction indicated by the arrow in Fig. 2 causing the fruit carried by the fingers 35 to be carried to a point opposite the upper end of the chute 14. As the fingers 35 pass around the pulley 34, which is the upper pulley, the fruit is discharged from them into the upper end of the chute 14. In accordance with the preferred form of the invention a finger 37 extends from the upper end of the chute 14 to pass between the fingers 35 on the belt and thereby positively remove or lift the fruit from the fingers 35. In accordance with the invention an opening 38 is provided in the rear side of the hopper 13 and a trough 39 extends from within the hopper 13 to and around the lower part of the conveyer so that fruit delivered to the hopper is conducted to the lower end of the conveyer where it is picked up by the fingers 35 of the conveyer.

The fluid reservoir 16 is arranged somewhat below the parts of the mechanism herein so far described, as clearly illustrated in Fig. 2 of the drawings. The fluid conduit 19 forms the intake pipe of the pump 18 and extends from the lower part of the reservoir 16 to the intake of the pump 18. The fluid conduit 20 is the discharge pipe of the pump 18 and extends from the pump to the underside of the body 21 of the grinder. In accordance with the invention a baffle 40 extends downwardly from the under side of the body 21 in front of the pipe 20, as clearly illustrated in Figs. 1, 2 and 3 of the drawings. When the pump is in operation liquid L is drawn from the reservoir 16 through the pipe 19 and is discharged against the baffle 40 from the pipe 20. From the baffle 20 the liquid drips into a suitable funnel 41, or the like, arranged below the body 21 from which it is conducted by the pipe 17 back to the reservoir 16. In accordance with the preferred form of the invention the funnel 41 and conduit 17 are formed of glass, or the like.

In accordance with the general arrangement provided by the present invention the conveyer 15 is, as before stated directly behind the hopper 13 and chute 14 so that it cannot be seen when viewing the front of the grinder and chute. The other parts, such as the pump 18, reservoir 16, conduits, etc., may be arranged in any suitable or convenient manner so that they are concealed from view by the display device hereinafter described. In the particular form and arrangement set forth in the drawings the parts of the mechanism are carried by a horizontal frame member 41$^a$ and the various moving parts, that is the operating shaft 22 of the grinder, the pump 18, and one pulley of the conveyer 15, are driven from a suitable electric motor 43 through suitable driving connections as illustrated in Fig. 4.

The particular display device 11 which I illustrate in the drawings has a vertical wall part 50, a fruit part 51, that is a part shaped and finished to represent a fruit, at the upper part of the wall 50, and a barrel part 52, that is a part shaped and finished to represent a barrel, at the lower part of the wall 50. The fruit part 51 which I have illustrated in the drawings is shaped and finished to represent a part of an orange, or the like. The fruit part 51 is formed with a sight opening having a horizontal part 60 and a vertical part 61. In accordance with the invention the mechanism 10 is mounted or arranged behind the display device 11 so that the grinder is in register with, or directly behind, the horizontal part 60 of the sight opening while the chute 14 is in register with, or directly behind, the vertical part of the sight opening. The side walls 26 of the chute are extended to meet the edges of the vertical part 61 of the sight opening, as I have illustrated in the drawings. It is preferred that the sight opening in the projection 51 be large enough only to allow a person in front of the structure to see the front of the chute and the front of the grinder 21 and a part of the driving means in connection with the grinder, the funnel 41, and the fluid conduit 17. The fluid conduit 17 preferably extends down the outside of the lower portion of the fruit 51 and enters the upper part of the barrel part 52.

The barrel part 52 is preferably finished to appear as a part of a barrel. A liquid reservoir 72 is arranged behind the display device and a fluid conduit 71 extends from the reservoir to the lower part of the barrel part 52. A faucet 70 is arranged at the end of the conduit 71 immediately outside of the lower part of the barrel part 52, as clearly illustrated in Fig. 2 of the drawings.

In operation the conveyer 15 delivers the fruit into the top of the chute 14. The baffles 29 in the chute 14 prevent the fruit from dropping quickly through the chute by making it pass from side to side in the chute and drop from one chute to the next between each movement from side to side. The fruit is discharged by the chute into the hopper 13 of the grinder and is carried out of the hopper 13 by the trough 39. From the guide 38 the fruit is again picked up by the conveyer which again delivers it to the upper end of the chute 14. In practical operation it is preferred that whole fruits be used in the device and that two or three pieces of fruit be kept operating in the device at all times. It will be obvious, however, that the device might be designed to handle parts of fruit and that various numbers of pieces or parts might be handled by the device at any one time. At the same time that the fruit is being handled by the mechanism the liquid L, which in practice is fruit juice is circulated by pump 18 so that it falls from the baffle 40 into the funnel 41 from which it flows downwardly through the conduit 17 and back into the reservoir 16. The reservoir 16 is preferably somewhat above the point where the conduit 17 enters the barrel part 52 of the display device so that there will always be some liquid standing in the lower part of the conduit 17 where it can be seen by persons viewing the device. In practice fruit pulp P is arranged on the frame part 41ª to cover the discharge end of the body of the grinder so that it appears that fruit pulp is discharged from the grinder. A person drawing liquid from the reservoir 72 through the faucet 70 is apparently drawing the liquid from the barrel part 52, or in other words, liquid drawn from the faucet 70 is apparently the liquid that has been delivered to the barrel part from the grinder. It will be obvious that the structure provided by the present invention is particularly attractive, that it is a particularly effective advertising device, and how it demonstrates the extraction of fruit juice etc. It has been found in practice that the device actually causes great comment wherever it is installed and that it is a particularly effective and attractive display and advertising device.

From the foregoing description it will be evident that the grinder constituting one element of the apparatus may be any suitable device, adapted to actually express juice from fruit, or merely a member having the external form of such a device. The term "grinder" as employed in the claims is to be understood therefore as including any grinder, press or other mechanism for operating on fruit or the like to express juice therefrom or a member having the exterior form and appearance of such a mechanism without containing means for actually crushing fruit, etc.

Having described only a preferred form of my invention I do not wish to limit myself to the particular details hereinabove set forth but wish to reserve to myself any changes that may appear to those skilled in the art or that may fall within the scope of the following claims.

Having described a preferred form of my invention, I claim:

1. In a structure of the character described, a substantially vertical chute adapted to receive fruit, or the like, at its upper end and discharge it from its lower end, the chute embodying a plurality of baffles arranged to prevent the fruit from passing straight through the chute, the chute having a sight opening which allows the fruit to be seen as it passes through the chute.

2. A chute for fruit, or the like, having a sight opening at its front, and baffles extending inwardly and downwardly alternately from the sides of the chute to prevent fruit from passing straight through the chute.

3. In combination, a device having the appearance of a grinder, the device having a receiving hopper with an outlet opening at a point removed from the front of the device, a substantially vertical chute arranged to discharge into the hopper, the chute being open at its front side, a conveyer arranged back of the device and chute for delivering fruit, or the like, to the upper end of the chute, and a trough for directing fruit from the outlet opening in the hopper to the conveyer so that it will be caught by the conveyer and delivered to the chute.

4. In combination, a device having the appearance of a grinder, the device having a receiving hopper with an outlet opening, a substantially vertical chute arranged to discharge into the hopper, a conveyer for delivering fruit, or the like, to the upper end of the chute, a trough for directing fruit from the outlet opening in the hopper to the conveyer so that it will be caught by the conveyer and delivered to the chute, and means for supplying liquid to the device so that it appears as the juice of the fruit delivered to the hopper.

5. In combination, a device having the appearance of a grinder, the device having a receiving hopper with an outlet opening at a point removed from the front of the device, a substantially vertical chute arranged to discharge into the hopper, the chute having an opening at its front, a conveyer arranged back of the device and chute for delivering fruit, or the like, to the upper end of the chute, a trough for directing fruit from the outlet opening in the hopper to the conveyer so that it will be caught by the conveyer and delivered to the chute, a baffle at the device, a fluid reservoir, means for delivering liquid from the reservoir to the baffle, and means spaced below the grinder for receiving the liquid delivered to the baffle and delivering it to the reservoir.

6. In combination, a device having the appearance of a grinder, the device having a receiving hopper with an outlet opening at a point removed from the front of the device, a substantially vertical chute arranged to discharge into the hopper, the chute being open at its front side, a conveyer arranged back of the device and chute for delivering fruit or the like, to the upper end of the chute, a trough for directing fruit from the outlet opening in the hopper to the conveyer so that it will be caught by the conveyer and delivered to the chute, a baffle at the device, a funnel below the baffle, a fluid reservoir, a pump receiving fluid from the reservoir and delivering it to the baffle, and a conduit carrying fluid from the funnel to the reservoir.

7. In combination a mechanism including a device having the appearance of a grinder, the device having a receiving hopper with an outlet opening, a vertical open front chute above the hopper, a conveyer back of the device and chute to receive fruit from the outlet opening and deliver it to the upper end of the chute, and means for delivering fluid to the device, and a display device having a sight opening with a part registering with the chute and a part registering with the device, the sight opening allowing only the front of the chute and device to be seen through it.

8. In combination a display device having a part representing a barrel and a part with a sight opening, a mechanism including a device having the appearance of a grinder, the device having a receiving hopper with an outlet opening, a chute above the hopper, the chute and device being in register with the sight opening, a conveyer back of the device and chute for receiving fruit, or the like, from the outlet opening and delivering it to the chute, means for delivering fluid to the device, and a conduit for receiving fluid at the device and extending at the front of the display device from the device to the part of the display device that represents a barrel.

9. In combination with a display device having a part representing a fruit, a part representing a barrel, and a sight opening in the first mentioned part, a fluid reservoir back of the display device, a conduit extending from the reservoir to the lower part of the barrel part of the display device, a faucet at the end of the conduit and at the front side of the display device, a device having the appearance of a grinder in register with a part of the sight opening, the device having a hopper with an outlet opening, a chute in register with another part of the sight opening and arranged above the hopper, a conveyer back of the device and chute for receiving fruit or the like, from the outlet of the hopper and delivering it to the chute, a second fluid reservoir, a pump for delivering fluid from the second reservoir to the device, a funnel at the device and in register with the sight opening for receiving the fluid delivered to the device, and a fluid conduit extending from the funnel, in front of the display device, into the upper part of the barrel part of the display device, and to the second reservoir.

10. A chute for fruit, or the like, and means in the chute to prevent fruit from passing straight through the chute, the chute having a sight opening at said means to allow the fruit to be seen in the chute.

11. A chute for fruit, or the like, and a plurality of baffles in the chute to prevent fruit from passing straight through the chute, the chute being open at its front so that the fruit can be seen as it passes through the chute.

12. In combination, a device having the appearance of a grinder, the device having a receiving hopper with an outlet opening at a point removed from the front of the device, and a conveyer for receiving fruit, or the like, from the outlet opening of the device and discharging at a point directly over the hopper so that it will fall into the hopper.

13. In combination, a device having the appearance of a grinder, the device having a receiving hopper, a chute for fruit leading to the hopper, and a display device, shaped and colored to represent a fruit, arranged in front of the device and chute and provided with a sight opening through which the device and fruit passing through the chute to the device are visible.

14. In combination, a device having the appearance of a grinder, the device having a receiving hopper, a chute for fruit leading to the hopper, a reservoir, a display device having a portion in front of the grinder and chute shaped and colored to represent a fruit and provided with an opening through which the device and fruit passing through the chute to the hopper are visible, and a portion shaped and colored to represent a barrel, a conduit leading from the reservoir through the front of the barrel portion of the display device to a position below the device, and including a transparent section, and means for circulating liquid from the reservoir through said conduit.

In witness that I claim the foregoing I have hereunto subscribed my name this 18 day of Nov., 1921.

LEONARD T. SINTZEL.

Witness:
E. D. CAVENDER.